E. H. GOLLINGS.
ROTARY POWER DEVICE.
APPLICATION FILED JAN. 15, 1917. RENEWED JUNE 7, 1918.
1,284,650.
Patented Nov. 12, 1918.
2 SHEETS—SHEET 1.
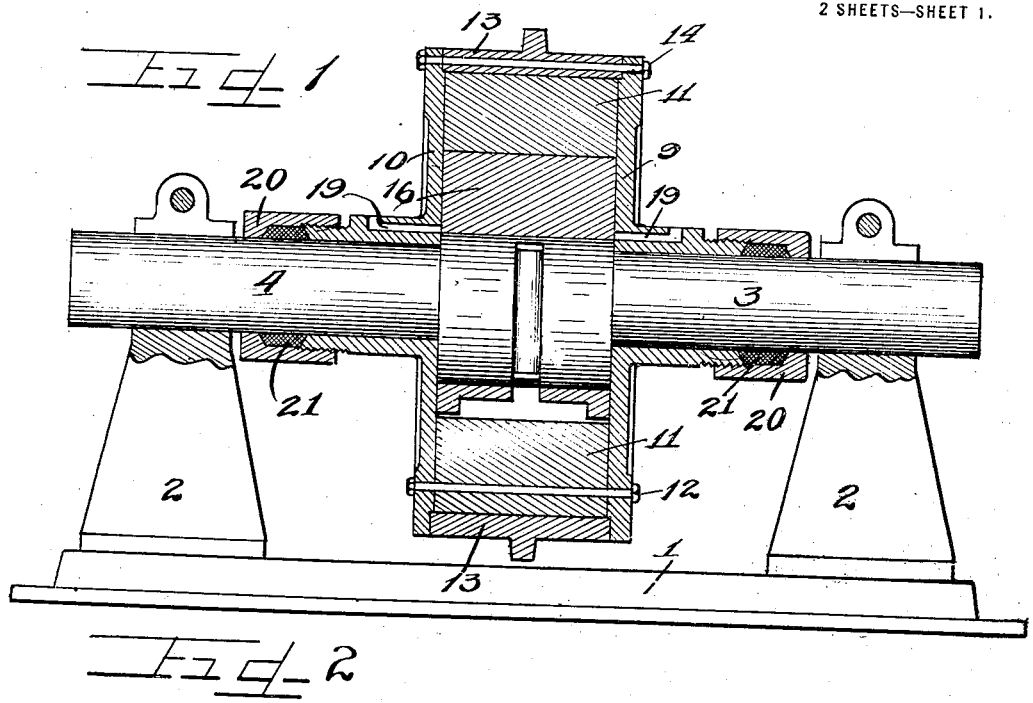
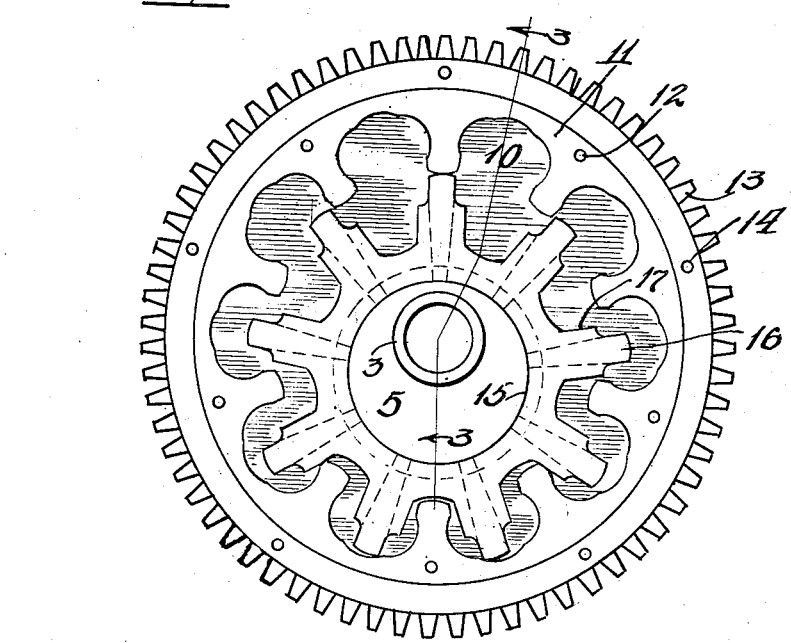

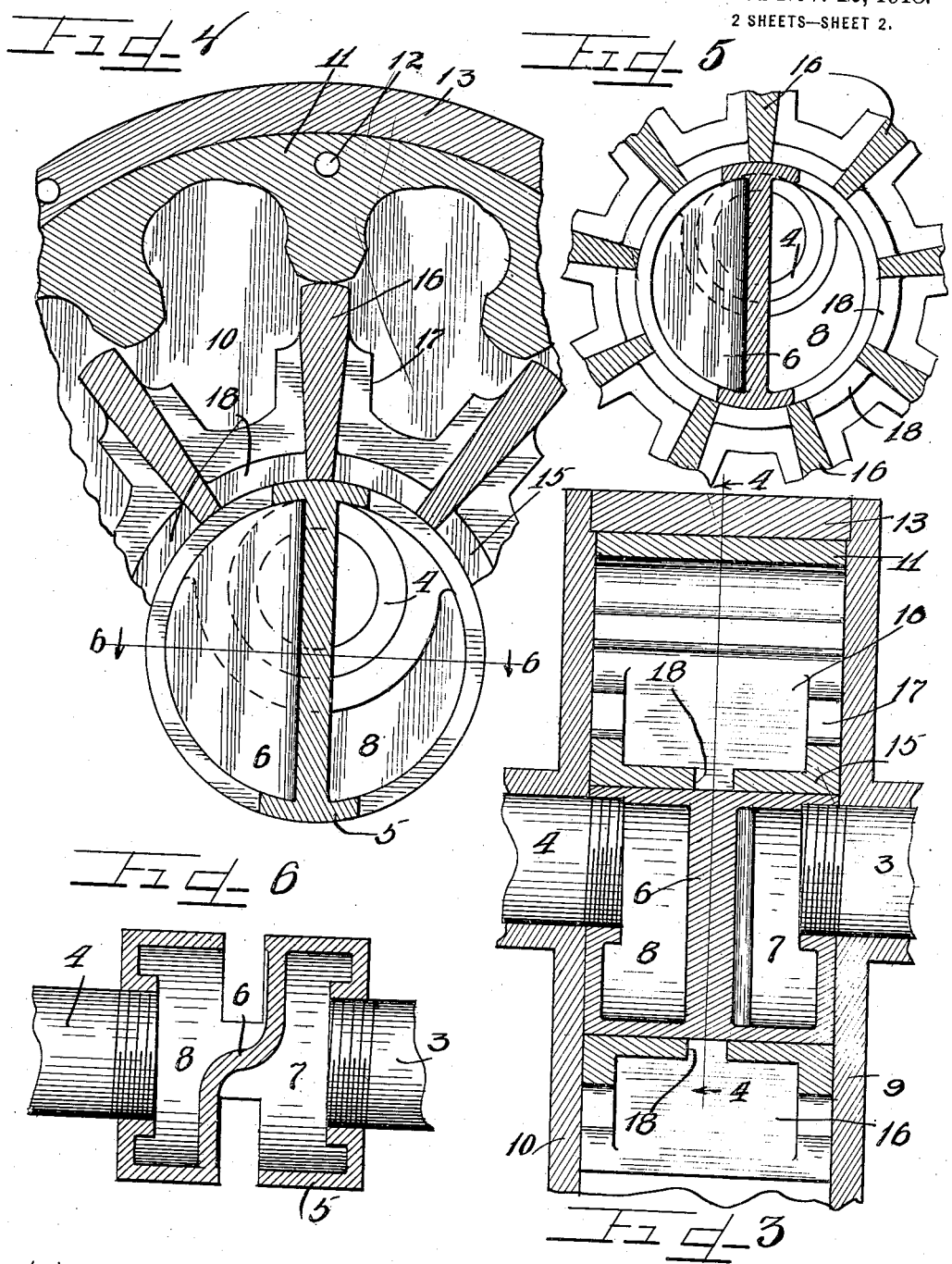

UNITED STATES PATENT OFFICE.

ELLICK H. GOLLINGS, OF CHICAGO, ILLINOIS.

ROTARY POWER DEVICE.

1,284,650.　　　　　Specification of Letters Patent.　　Patented Nov. 12, 1918.

Application filed January 15, 1917, Serial No. 142,381.　Renewed June 7, 1918.　Serial No. 238,773.

*To all whom it may concern:*

Be it known that I, ELLICK H. GOLLINGS, a citizen of the United States, and a resident of the city of Chicago, in the county of Cook and State of Illinois, have invented certain new and useful Improvements in Rotary Power Devices; and I do hereby declare that the following is a full, clear, and exact description of the same, reference being had to the accompanying drawings, and to the numerals of reference marked thereon, which form a part of this specification.

This invention relates to a rotary power device adaptable either as a driving or driven element, and utilizing a fluid, preferably a liquid such as water, for the purpose. When used as a driving device, the liquid is pumped therethrough, and when used as a driven device, the mechanism receives its movement due to a forced flow of liquid therethrough. The invention involves only two moving elements, so constructed and associated with one another that one is caused to be driven by the other. The moving parts, due to their peculiar construction, operate at different rotational speeds, and when operating as a pump, the liquid is trapped between said moving elements and expelled under pressure therefrom, and additional liquid is drawn inwardly by suction into the device to be eventually expelled therefrom under pressure.

It is an object therefore of this invention to construct a power device adapted to be used as a driving or a driven element and embracing rotatably mounted members, one rotatable within the other and adapted to be driven thereby, and with the members so constructed as to trap quantities of a fluid admitted thereinto, thereby utilizing the pressure effect of the liquid to drive the device, or, if the device is otherwise driven, exerting a pressure effect due to trapping of the liquid to pump the liquid therethrough under pressure.

It is also an object of this invention to construct a power device embracing an outer drum rotor provided with a series of inwardly facing teeth on the interior thereof, and with an inner rotor provided with a plurality of radial teeth or vanes journaled eccentrically within said outer rotor and adapted to be driven thereby due to the engagement of the teeth of the respective rotors, and affording a plurality of trap compartments for a liquid passed through the device.

It is also an object of this invention to construct a power device embracing an outer rotatable member adapted to drive an inner rotatable member journaled eccentrically therewithin, and co-acting therewith to trap a fluid whereby the fluid may be used as a propelling means for the device, or the device, when driven, may operate as a propelling means for forcing the fluid therethrough.

It is a further object of this invention to construct a power device, simple in construction and operation, and capable of utilizing a fluid either as a power transmitting or power propelling medium in the operation of the device.

Other and further objects will appear from the disclosure in the specification and drawings.

The invention (in a preferred form) is illustrated in the drawings and hereinafter more fully described.

On the drawings:

Figure 1 is a central vertical section with parts in elevation taken through a device embodying the principles of my invention.

Fig. 2 is a detail interior side elevation of the device with one shaft section and a side wall plate removed.

Fig. 3 is an enlarged fragmentary detail section taken on line 3—3 of Fig. 2.

Fig. 4 is a detail section taken on line 4—4 of Fig. 3.

Fig. 5 is a fragmentary sectional detail through the hubs of the respective rotative elements.

Fig. 6 is a fragmentary detail section with parts omitted on line 6—6 of Fig. 4.

As shown on the drawings:

Referring to Fig. 1, the reference numeral 1, indicates a base of any suitable construction provided with upright bearing standards 2, and mounted in stationary relation in said respective bearing standards are alined tubular shafts 3 and 4, respectively. As clearly shown in Figs. 3 and 6, the adjacent ends of said tubular shafts 3 and 4, are threaded into an integral stationary eccentric hub member 5, provided with a centrally disposed partition wall 6, dividing said eccentric hub member into two compartments 7 and 8, respectively, which open through peripheral slots in the hub member. Said hub member 5, affords a rigid connection between the inner ends of the respective shafts 3 and 4. Journaled upon the respective tubular shafts 3 and 4, is an outer rotatable drum element or rotor comprising side walls 9 and 10, respectively, each provided with an extended hub for proper bearing upon the stationary shafts 3 and 4, and an elastic or yieldable toothed ring or annulus 11, such as a rubber or fiber composition, is bolted rigidly and in sealing relation between said side wall members by bolts 12. Surrounding said toothed annulus 11, is a ring member 13, held secured between the respective side wall members 9 and 10, by bolts 14, which are staggered with respect to the bolts 12, as clearly shown in Fig. 2, and said ring member 13, may be provided with teeth on the peripheral surface thereof, as shown in Fig. 1, to afford a means of imparting a drive to the device, to rotate the outer rotor.

Journaled upon the eccentric hub member 5, as clearly shown in Fig. 2, is an inner rotor 15, having a series of radial blades or vanes 16, and with toothed shaped recesses 17, formed at each side of said rotor between the ends of the vanes thereof. The purpose of the tooth shaped recesses 17, is to permit a co-active driving relation with the teeth of the annulus 11, as shown clearly in Fig. 2, whereby a drive may be imparted from one to the other of said rotor members.

As shown, there are an even number of teeth upon the outer rotor member, and an odd number of teeth upon the rotor member 15, in the present instance there being ten teeth upon the outer rotor and nine upon the inner rotor. Of course, it is obvious that this construction may be reversed if desired, and the odd number of teeth provided on the outer rotor and the even number on the inner rotor. Slots 18, are provided in the hub of the member 15, between the vanes 16, as clearly shown in Figs. 3 and 5, and said slots register, as clearly shown in Fig. 4, with the peripheral slots opening from the respective compartments 7 and 8, of the hub member 5.

As shown clearly in Fig. 1, oil passages 19, are provided in the hub extension of the side wall members 9 and 10, respectively, whereby a suitable lubricant may be introduced into the interior of the device for the bearing surfaces thereof. The outer ends of the hub extensions of the respective side wall members 9 and 10, are threaded, and engaged thereon are flanged members 20, which serve to compress and retain suitable packing 21, around the stationary shafts 3 and 4, and to prevent leakage of the fluid from the rotating members.

The operation is as follows:

The device, when used as a pump, receives the fluid through the tubular stationary shaft 3, and compartment 7, of the hub member 5, from which it flows through the peripheral slot of the hub member through the respective slots 18, of the vane rotor 15, into the spaces between the same and the annulus element 11, at the right of the figure, referring to Fig. 2. Of course, the outer drum or rotor member of which the annulus member 11, forms a part, is rotated counterclockwise, referring to Fig. 2, and after the small compartments between the respective interfitting teeth of the rotor elements move to the left side of the device, referring to Fig. 2, the fluid is compressed and flows through the peripheral slots 18, into the compartment 8, of the hub member 5, and outwardly through the stationary tubular shaft 4.

The outer toothed rotor member serves to drive the inner vane rotor 15, due to engagement of the teeth of the outer member with the toothed recesses 17, of the vane rotor, as shown in Fig. 2, and due to the difference in number of teeth of said respective member, a differential rotation thereof takes place, that is, the outer member rotates nine revolutions to ten revolutions of the vane rotor. The respective radii of the inner and outer rotor members is such that the upper vane 16, of the vane rotor, when in the instant position of the parts shown in Fig. 2, seals against a yieldable tooth of the outer rotor element, and similarly, at the lower portion of the device for the instant view shown in Fig. 2, two of the vanes 16, seal yieldably within the recesses between certain of the teeth of the outer rotor member so that an effectual seal between the fluid being compressed and the fluid being drawn inwardly by suction in the different portions of the device is assured.

When the device is used as a driven element, the fluid is forced inwardly through the stationary shaft 3, under pressure, and passes through the compartment 7, of the eccentric hub member 5, into the compartment at the right side of the figure, referring to the instant view of the device shown in Fig. 2, and forces a rotation of the associated members counterclockwise. After the pressure effect of the fluid is dissipated in effecting rotation of said members, the fluid passes outwardly through the compartment 8, of the eccentric hub member through the tubular stationary shaft 4.

I am aware that various details of construction may be varied through a wide range without departing from the principles of this invention, and I therefore do not purpose limiting the patent granted otherwise than necessitated by the appended claims.

I claim as my invention:

1. A power device of the class described comprising a pair of rotors, one eccentrically mounted and one rotatable within the other, and a plurality of toothed members formed on each thereof, the members on one being resilient and yieldable and said toothed members co-acting with one another to effect a transfer of fluid through the device when one of said rotors is driven.

2. In a device of the class described, an inner and outer rotor, one adapted to be driven by the other thereof, said rotors affording a plurality of compartments therebetween, an internal annulus on the outer rotor having resilient teeth, an external ring on the outer rotor having an annular gear thereon by means of which the rotor is driven, radial vanes on the inner rotor adapted to be engaged by the resilient teeth to be actuated to force the fluid through the device by compression in the respective compartments thereof.

3. In a device of the class described an outer rotor, an annular gear secured thereto, an inner annulus secured thereto, having resilient teeth, an eccentrically mounted rotor in said outer rotor, vanes secured thereto co-acting with the teeth to divide the outer rotor into a pair of chambers and a hollow shaft adapted to communicate with each chamber.

In testimony whereof I have hereunto subscribed my name in the presence of two subscribing witnesses.

ELLICK H. GOLLINGS.

Witnesses:
 CHARLES W. HILLS, Jr.
 EARL M. HARDINE.